United States Patent Office 2,747,611
Patented May 29, 1956

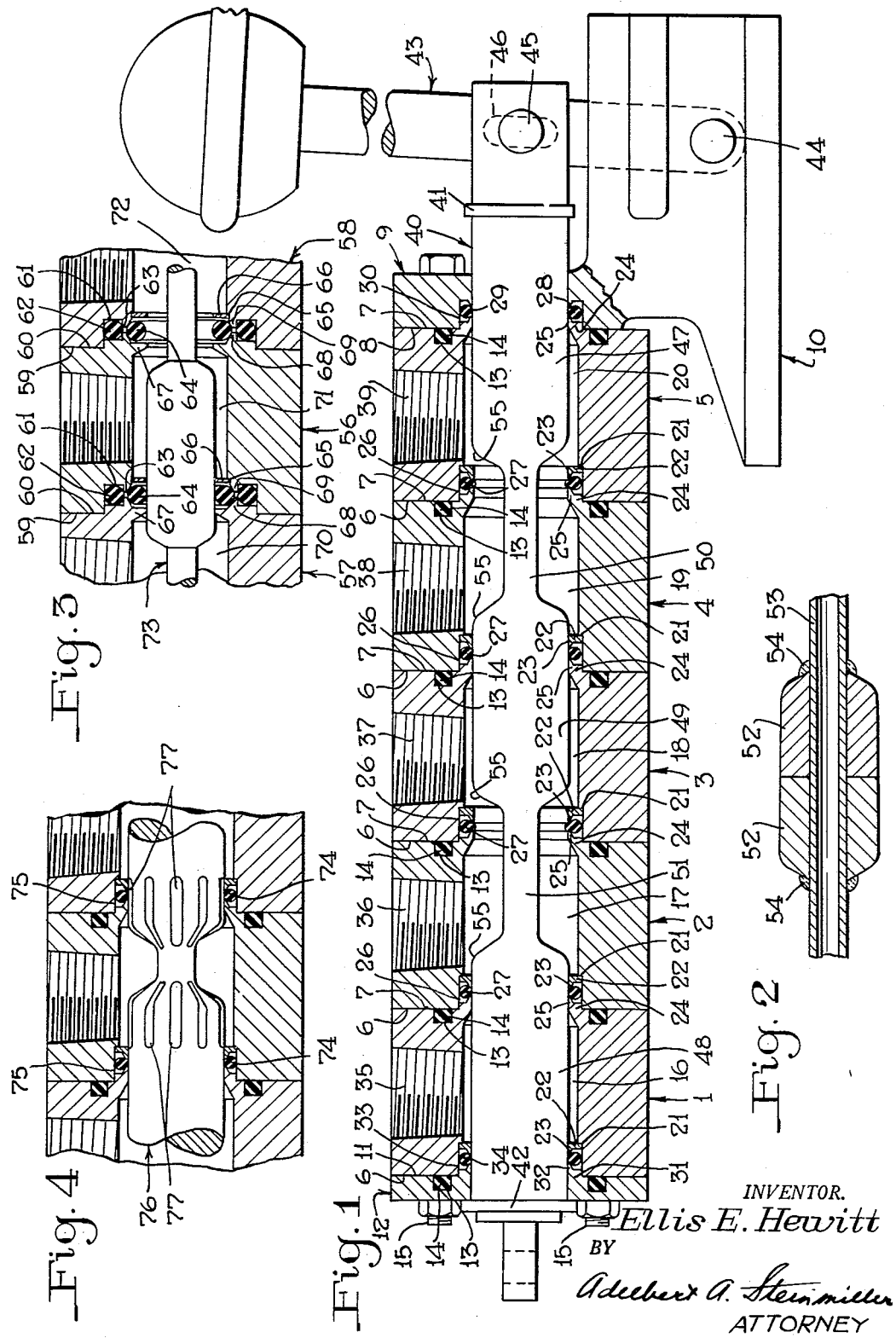

2,747,611
CONTROL VALVE DEVICE

Ellis E. Hewitt, Ruffsdale, Pa., assignor to Westinghouse Air Brake Company, Wilmerding, Pa., a corporation of Pennsylvania Application January 23, 1953, Serial No. 332,831

2 Claims. (Cl. 137—622)

This invention relates to fluid pressure control valve devices and, more particularly, to the type for pneumatically controlling a plurality of operations or devices.

In a system where fluid under pressure is employed to operate a plurality of individual devices, a single control valve device can often be used to advantage to selectively control the operation of said devices instead of employing a separate control valve device for each fluid pressure device. Moreover, it would be desirable that such a control valve device be so constructed as to be readily adaptable to different applications.

One object of the invention, therefore, is the provision of an improved control valve device for the above purpose.

Another object of the invention is the provision of a control valve device, the casing of which is adapted to be built up from identical body sections which may vary in number according to the number of operations or devices adapted to be controlled, and which sections are relatively simple and inexpensive to produce and are adjustable relative to each other to facilitate installation of the device.

A spool type slide valve, employing one or more spools or lands, dependent upon the number of operations or devices to be controlled, may be employed in connection with a control valve device of the above type. The casing may be provided with annular grooves in which resilient O-rings are disposed for sealing and sliding contact with the spools in order to prevent leakage of fluid under pressure past the spools from one side of the respective O-ring or rings to the opposite side.

Another object of the invention is the provision of simple and novel arrangements for mounting such O-rings in a multi-section control valve device of the above type.

Still another object of the invention is the provision of improved means for maintaining an O-ring in its respective groove even under conditions wherein pressure of fluid may accumulate back of the O-ring which would tend to blow it from its groove when pressure on the opposite side, or spool sealing surface, is removed.

Other objects and advantages of the invention will appear in the following more detailed description thereof made in connection with the accompanying drawing, wherein:

Fig. 1 is an elevational view, partly in section and partly in outline, of a control valve device constructed in accordance with one embodiment of the invention; Fig. 2 is a longitudinal sectional view of a portion of a modified spool valve for use in a structure such as shown in Fig. 1; and Figs. 3 and 4 are views similar to a portion of the structure shown in Fig. 1 but embodying other modifications of the invention.

Description—Figs. 1 and 2

As shown in the drawing, this embodiment of the improved control valve device comprises a plurality of identical casing sections designated by reference numerals 1, 2, 3, 4 and 5, each having oppositely arranged plane surfaces, or faces, 6 and 7; the surfaces 6 on casing sections 2, 3, 4 and 5 abutting surfaces 7 on casing sections 1, 2, 3 and 4, respectively. For illustrating the invention only five casing sections are shown in the drawing, it being understood that the valve device may comprise more or fewer of said sections according to the use to which it may be put, as hereinafter will be brought out in greater detail. The plane surface 7 on casing section 5 abuts a corresponding surface 8 on an end-cap 9 formed integral with a mounting base 10 forming a part of the valve device, while plane surface 6 on casing section 1 is engaged by a corresponding surface 11 on an end-cap 12. Opening to surface 11 of end cap 12 and to surface 7 in each of the casing sections 1, 2, 3, 4 and 5 are annular grooves 13, respectively, in each of which there is disposed a sealing gasket 14 for contact with the abutting surface 6 of the casing sections 1, 2, 3, 4 and 5 and surface 8 of end-cap 9, respectively. A plurality of bolts 15 extend through the casing sections 1, 2, 3, 4 and 5 and the end-caps 9 and 12 securing said casing sections and said end-caps in abutting contact with each other and to the mounting base 10.

Each of the casing sections 1, 2, 3, 4 and 5 is provided with a chamber or bore, designated by the numerals 16, 17, 18, 19 and 20, respectively, said bores being arranged in coaxial relation with each other, and in each of said casing sections one end of its respective bore terminates short of the respective surface 6 in an annular shoulder 21 constituting the bottom of a counterbore extending inwardly from said surface. Mounted in the counterbore and against the shoulder 21 in each of the casing sections 1, 2, 3, 4 and 5 is a retaining ring 22 having at its inner edge an annular lip 23 extending from the ring in the direction of the respective plane surface 6.

In each of the casing sections, 1, 2, 3, 4 and 5 the opposite end of the bore, or chamber 16, 17, 18, 19 and 20, terminates short of the respective plane face 7 at an annular, boss-like, inwardly extending flange 24 which also extends beyond said face and slidably fits into the counterbore carrying retaining ring 22 in the adjacent casing section for aligning the two casing sections with each other. At the inner edge of each flange 24 there is an annular lip 25 extending in the direction of the lip 23 on the retaining ring 22 in the abutting end of the adjacent casing section, said two lips 23 and 25 being of the same diameter and in coaxial relation with the respective casing bores or chambers 16, 17, 18, 19 and 20, but of smaller diameter than said casing bores. The lips 23 and 25 described above terminate short of each other to provide an annular space therebetween opening an annular channel 26, defined by the flange 24 and retaining ring 22 and the cylindrical surface of the counterbore carrying said ring, to the axial openings through said flanges and rings. A resilient O-ring 27 is mounted in each of the channels 26; each of said O-rings being slightly compressed against the wall of the counterbore containing the respective retaining ring 22 and against the respective lips 23 and 25 and extending slightly through the space between said lips into the axially aligned openings through said retaining ring and flange 24.

The end-cap 9 has a counterbore into which flange 24 of the adjacent casing section 5 slidably fits, and also has at the bottom of said counterbore a lip 28, corresponding functionally to the lip 23 on the retaining rings 22, above described, and arranged to cooperate with lip 25 on said flange to form a channel 30 for carrying an O-ring 29 in the same manner as the O-rings 27 are carried. The end-cap 12 has a cylindrical boss-like flange 31 which slidably fits into the counterbore of the adjacent casing section 1, for aligning purposes, and said flange has a lip 32, corresponding to lips 25 on flanges 24 and arranged to cooperate with the oppositely turned lip 23 on the retaining ring 22 in the adjacent casing section 1 to provide a channel 33 which also carries an O-ring 34 in the same manner as the O-rings 27 above described; all of the O-rings 27, 29 and 34 in the device being identical.

The casing sections 1, 2, 3, 4 and 5 are provided with pipe-connecting bores, or screw-threaded ports 35, 36, 37, 38 and 39, respectively, connecting chambers 16, 17, 18, 19 and 20, respectively, to an external surface of the respective casing section. The bolts 15 only two of which are shown in the drawing, are symmetrically arranged whereby the several casing sections are adjustable rotarily, relative to each other, about the axis of the device so that ports 35, 36, 37, 38 and 39 may be aligned for connection with pipes in an apparatus with which it is desired to associate the control valve device.

A spool type slide valve 40 extends through the several chambers 16, 17, 18, 19 and 20 and coaxially aligned bores in end-caps 9 and 12, respectively, in sliding contact with the walls of said bores. Beyond the end-caps 9 and 12 the valve 40 is provided with stop collars 41 and 42 for engaging said end-caps, respectively, to define two different limit and reciprocative positions of said valve. The valve 40 may be moved to its different positions by any suitable means, such as a manually operative handle 43 having one end fulcrumed on a pin 44 carried in the mounting base 10 and connected, intermediate its ends, to the adjacent end of said valve by a pin 45 passing horizontally through a slot 46 in said handle.

The valve 40 comprises two end land portions 47 and 48 adjacent the end-caps 9 and 12, respectively, and in constant sliding contact with O-rings 29 and 34, respectively. The land 48 is of such length that in a right-hand position of the valve 40, defined by contact between collar 42 and end-cap 12, and in which it is shown in the drawing, said land will also have sliding contact with O-ring 27 disposed between casing sections 1 and 2 for closing communication between chambers 16 and 17, while, in said right-hand position of valve 40, the land 47 will be out of contact with O-ring 27 disposed between casing sections 4 and 5 for opening communication between chambers 19 and 20. The land 47 is of such length that in a left-hand position of valve 40, defined by contact between collar 41 and end-cap 9, said land will also have sliding contact with O-ring 27 disposed between casing sections 4 and 5 for closing communication between chambers 19 and 20, while, in said left-hand position of valve 40, the land 48 will be out of contact with O-ring 27 disposed between casing sections 1 and 2 for opening communication between chambers 16 and 17.

The valve 22 also comprises an intermediate land portion 49 the opposite ends of which are connected to the land portions 47 and 48 by reduced portions 50 and 51, respectively, the length of land 49 and of said reduced portions being substantially the same as the distance between two successive O-rings 27, whereby in the right-hand position of valve 40 the land 49 will be out of contact with the O-ring 27 disposed between casing sections 2 and 3 for opening communication between chambers 17 and 18, while at the same time being in sliding contact with O-ring 27 disposed between casing sections 3 and 4 for closing communication between chambers 18 and 19. In the left-hand position of valve 40 the land 49 will be in sliding contact with O-ring 27 disposed between casing sections 2 and 3 for closing communication between chambers 17 and 18 and out of contact with O-ring 27 disposed between casing sections 3 and 4 for opening communication between chambers 18 and 19.

The valve 22 may be made in any suitable fashion, as in one piece as shown in Fig. 1, or, if desired, the lands may be in separate, matching halves 52 slidably mounted on a core of commercial tubing 53, abutting each other and secured in the desired position on said tubing by soldering as at 54, as shown in Fig. 2 of the drawing.

In operation, assume that port 37 is connected to a source of fluid under pressure (not shown), that ports 36 and 38 are connected, for example, to a double acting fluid pressure operable motor (not shown) and that ports 35 and 39 are merely open to atmosphere. In the right-hand position of valve 40, it will be seen that fluid under pressure will be supplied from port 37 to port 36 while port 38 will be vented to atmosphere via port 39 to cause one operation of the fluid pressure operable motor, while in the left-hand position of said valve port 36 will be vented to atmosphere via port 35 and fluid under pressure from port 37 will be supplied to port 38 for causing another operation of said motor.

If desired, port 37 may be open to atmosphere, ports 35 and 39 be connected to a source of fluid under pressure and ports 36 and 38 may be connected to the fluid pressure motor and the same results obtained. On the other hand, if it should be desired to control the supply and release of fluid under pressure to one pipe only for effecting a desired operation, said pipe could be connected to port 38 and either port 37 or 39 connected to a source of fluid under pressure and the other open to atmosphere. For such a use the two casing sections 1 and 2 could be dispensed with and a valve of corresponding suitable length could be employed in place of valve 40. It will be seen that any desired number of casing sections, with a valve 40 to suit, may be employed, depending upon what it is desired to control.

In any valve device using O-rings such as 27, 29 or 34 for seals, when the O-ring is in sealing contact with the valve land, separating a pressurized chamber at one side of the ring from a chamber at the opposite side of the ring, the pressure in the chamber at the one side of the ring will equalize by leakage back of the ring, and if the chamber at the opposite side of the ring is at a pressure lower than the pressure in the pressurized chamber, such as atmospheric pressure, for example, and the valve is moved out of contact with the ring to open the pressurized chamber to the atmospheric chamber, the pressure back of the ring will tend to blow the ring out of its groove. As applied to the structure shown in the drawing, if, for example, chamber 18 is pressurized and valve 40 is in the position in which it is shown in the drawing, the spaces at the adjacent sides and substantially over the back of the O-rings separating chambers 16 and 17 and chambers 18 and 19 will be charged with fluid under pressure, and when said valve is moved to its left-hand position out of contact with said O-rings so as to subject the valve seating faces of said O-rings to substantially atmospheric pressure in chambers 16 and 19, respectively, said O-rings will tend to be blown out of their respective channel 26. This is prevented, however, by the lips 23 on the respective retaining rings 22 and the cooperating lips 25 on the respective flanges 24 which act to hold the respective O-rings 27 in position against the force tending to blow them from their respective channels 26 until such force is dissipated by leakage of the fluid under pressure from back of the O-rings whereupon the resiliency of said O-rings will return them to their normal position in which they are shown in the drawing.

The structure shown in the drawing including the lips 23 and 25 is known to be satisfactory for the purpose intended and just described up to a certain relatively high pressure. For greater pressures, however, the O-rings are liable to become so wedged into the spaces between the respective lips 23 and 25 by said greater pressure when the valve 40 is moved out of contact with said O-rings, that the resilient force of the O-ring will be insufficient to pull the O-ring out of said space and return it to its normal position, with the result that when the valve 40 is again moved into said O-ring, it will tend to cut the O-ring and prematurely destroy it even though the leading edge of valve land 40 is chamfered as indicated at 55 in the drawing. This premature destruction of the O-ring may be avoided, however, by the structure shown in Fig. 3.

Description—Fig. 3

In this embodiment of the invention, the drawing shows only one casing section 56 and portions of two other identical casing sections 57 and 58, each having oppositely arranged plane faces 59 and 60, the faces 59 on casing sections 56 and 58 abutting faces 60 on casing sections 57 and 56, respectively. Each casing section 56 and 58 has an annular groove 61 opening to its face 59 and containing an O-ring-like sealing gasket 62 encircling and formed concentric with and connected by an annular flexible web 63 to a sealing O-ring 64. Each of the casing sections 56, 57 and 58 is provided with a chamber or bore, designated by the numerals 71, 70 and 72, respectively, said bores being arranged in coaxial relation with each other and with the O-rings 64. Each of the casing sections 56, 57 and 58 is also counterbored at the end having face 59 to provide a shoulder 65 for engagement by a retaining ring 66 taking the place of the retaining ring 22 in the structure shown in Fig. 1 and having a flat radial surface for engagement by the adjacent side of the respective O-ring 64. Each of the casing sections 56, 57 and 58 is also provided at the end having face 60, with an inwardly projecting, annular flange 67 having a flat radial face for engagement by the opposite side of the respective O-ring 64, said O-ring having sliding contact with the two opposing faces. Projecting toward each other from the adjacent faces 59 and 60 of the respective adjacent casing sections, are annular, relatively narrow and coaxially arranged ridges 69 and 68, respectively, integrally formed with said casing sections and substantially engaging opposite sides of the web 63, preferably immediately adjacent the sealing gasket 62. The annular groove 61 is in the form of a counterbore encircling the ridge 69 and into which slidably fits, for alignment purposes, a boss-like extension on the adjacent casing section upon which is formed the ridge 68 and which extension coacts with groove 61 to compress sealing gasket 62 to provide an air tight seal between the respective adjacent casing sections. The gasket 62 thus performs the function of the gasket 14 in the structure of Fig. 1 in addition to supporting the O-ring 64.

Shown in the drawing is a portion of a spool type valve 73 similar to valve 40 shown in Fig. 1.

In operation, when valve 73 is in contact with the O-ring 64 between sections 56 and 57 and said O-ring is subjected on one side to relatively high pressure of fluid in chamber 71, for example, and on the opposite side to a lower pressure, such as that of atmosphere, in chamber 70, for example, said high pressure will leak past the side of O-ring 64 adjacent to chamber 71 as far as the web 63 and thus become effective over less than the full outer peripheral surface of said O-ring. Then when valve 73 is moved out of contact with the O-ring 64 between casing section 56 and 57 and into contact with the O-ring 64 between casing sections 56 and 58 so as to cut off the supply of high pressure to chamber 71 and vent such high pressure to atmosphere through chamber 70, there will be less force to move the O-ring 64 between chambers 56 and 57 out of its respective groove between the retaining ring 66 and flange 67 than is the case in a structure such as shown in Fig. 1. Moreover, the web 63 will tend to hold O-ring 64 in its respective groove 61, but if said O-ring does move out to any degree, the pressure back of said O-ring will promptly dissipate past the side of the ring and said web will return said ring to its normal position thereby preventing the possibility of damage to the ring by subsequent movement of valve 73 into said ring.

Description—Fig. 4

If desired, a structure such as shown in Fig. 4 may be employed to ensure that O-rings 74, similar to the O-rings 27 in Fig. 1, will not be blown out of a channel 75, similar to channel 26 in Fig. 1, in which the O-rings 74 are disposed, and subsequently be prematurely destroyed, as above described. In this embodiment, the valve is designated by numeral 76 and the lands thereof are so extended as never to move out of contact with the O-rings 74, but the extended portions are provided around their peripheries with a plurality of spaced apart grooves 77 extending longitudinally of said valve for establishing the fluid pressure flow communications when said valve is moved to either of its two limit positions in which the extending, grooved portions are still in contact with the respective O-ring 74. Otherwise this modification is the same in structure as in Fig. 1, but it is desired to point out that, if desired, the lips 23 and 25 on the retaining rings 22 and flanges 24, respectively, shown and described in connection with the structure in Fig. 1, could be dispensed with and the side walls of the channel 26 could be in substantial contact with the sides of the O-rings.

Summary

It will now be noted that I have provided a relatively simple and inexpensive structure for manufacturing and maintaining and which, by the use of a greater or lesser number of casing sections and a suitable valve, may be readily adapted to control various fluid pressure operable devices or arrangements thereof. The device employs O-rings for sealing purposes with a spool type slide valve and various arrangements have been disclosed for preventing premature failure of said rings under conditions such as above described.

Having now described my invention, what I claim as new and desire to secure by Letters Patent, is:

1. A control valve device comprising, in combination, a plurality of identical casing sections each having at opposite ends plane surfaces and arranged in end to end relation by abutting engagement of the plane surfaces of each two adjacent casing sections, end-caps engaging the outermost plane surfaces of the two end casing sections, respectively, said casing sections and said end-caps having, respectively, coaxially aligned bores open to each other and each of said casing sections also having a pipe-connecting bore leading from the first mentioned casing bore to an external surface of the respective casing section, each of said casing sections and one of said end-caps further having integrally formed therewith at one of the corresponding ends thereof an annular boss-like flange extending beyond the corresponding plane surface into a counterbore of the adjacent end of the adjacent casing section and the other end-cap, respectively, for coaxial alignment of said casing sections and said end-caps, said flange forming one half of an annular channel and being provided with an annular lip spaced inwardly from the cylindrical wall of said counterbore and extending toward the adjacent casing section or end-cap, as the case may be, a retaining ring disposed in said counterbore of the adjacent casing section to form the other half of said channel and also provided with a lip of the same diameter as and extending toward the first mentioned lip but terminating short thereof thereby providing a restricted annular opening to said channel, a sealing gasket disposed in an annular groove opening to the plane surface of each casing section and one of the end-caps for sealing engagement with the adjacent plane surface of the adjacent casing section and the other end-cap, respectively, securing means holding said casing sections and said end-caps in assembled relation, a reciprocable spool type slide valve having alternately arranged lands and connecting portions of smaller diameter extending through said coaxially aligned bores and supported at opposite ends in the bores in said end-caps, and a resilient O-ring mounted in each of said channels having a cross-sectional diameter slightly greater than the width of the respective annular opening and the radial depth of the respective channel and extending through the annular opening for sliding and sealing contact with one of said valve lands.

2. A control valve device comprising, in combination, a plurality of identical casing sections each having at opposite ends plane surfaces and arranged in end to end relation by abutting engagement of the plane surfaces of each two adjacent casing sections, end caps engaging the outermost plane surfaces of the two end casing sections, respectively, said casing sections and said end-caps having, respectively, coaxially aligned bores open to each other and each of said casing sections also having a pipe-connecting bore leading from the first mentioned casing bore to an external surface of the respective casing section, each of said casing sections and one of said end-caps further having integrally formed therewith at one of the corresponding ends thereof an annular boss-like flange extending beyond the corresponding plane surface into a counterbore of the adjacent end of the adjacent casing section and the other end-cap, respectively, for coaxial alignment of said casing sections and said end-caps, said flange forming one half of an annular channel, a retaining ring disposed in a second counterbore of the adjacent casing section or end-cap, as the case may be, and cooperating with the bottom of said second counterbore to form the other half of said channel, the first named counterbore encircling said second counterbore, sealing means disposed in said channel comprising an annular sealing gasket clamped between the bottom of said first counterbore and the respective boss-like flange, a resilient O-ring disposed in said channel, a flexible web extending between and supporting said O-ring from said gasket, an annular rib extending from said flange and an oppositely arranged annular rib extending from the adjacent face of the adjacent casing section, the two ribs extending toward each other and substantially engaging opposite sides of said web, securing means holding said casing sections and said end-caps in assembled relation, and a reciprocable spool type slide valve having alternately arranged lands and connecting portions of smaller diameter extending through said coaxially aligned bores and supported at opposite ends in the bores in said end-caps, said lands arranged for sealing and sliding contact with one or another of said O-rings.

References Cited in the file of this patent

UNITED STATES PATENTS

| | | |
|---|---|---|
| 323,404 | Durfee | Aug. 4, 1885 |
| 423,105 | Allen | Mar. 11, 1890 |
| 1,879,415 | Mutrux | Sept. 27, 1932 |
| 2,485,504 | Morgan | Oct. 18, 1949 |
| 2,532,614 | Evans | Dec. 5, 1950 |
| 2,552,848 | Gabriel | May 15, 1951 |
| 2,630,326 | Bryant | Mar. 3, 1953 |
| 2,637,341 | Borst | May 5, 1953 |
| 2,645,450 | Chessman | July 14, 1953 |
| 2,661,182 | Kipp | Dec. 1, 1953 |
| 2,675,830 | Vuillemin | Apr. 20, 1954 |

FOREIGN PATENTS

| | | |
|---|---|---|
| 16,004 | Great Britain | 1891 |
| 244,757 | Great Britain | of 1926 |
| 973,215 | France | of 1950 |